United States Patent
Yoo et al.

(10) Patent No.: US 11,307,481 B2
(45) Date of Patent: Apr. 19, 2022

(54) SILICON-BASED OPTICAL MODULATOR

(71) Applicant: ELECTRONICS AND TELECOMMUNICATIONS RESEARCH INSTITUTE, Daejeon (KR)

(72) Inventors: Sanghwa Yoo, Daejeon (KR); Joon Ki Lee, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 83 days.

(21) Appl. No.: 16/889,086

(22) Filed: Jun. 1, 2020

(65) Prior Publication Data

US 2021/0072614 A1 Mar. 11, 2021

(30) Foreign Application Priority Data

Sep. 11, 2019 (KR) .................. 10-2019-0113055
Dec. 31, 2019 (KR) .................. 10-2019-0179195

(51) Int. Cl.
*G02F 1/225* (2006.01)
*G02F 1/025* (2006.01)

(52) U.S. Cl.
CPC ............ *G02F 1/2257* (2013.01); *G02F 1/025* (2013.01); *G02F 1/2255* (2013.01)

(58) Field of Classification Search
CPC ....... G02F 1/2257; G02F 1/025; G02F 1/2255
USPC ...................................................... 385/1–3
See application file for complete search history.

(56) References Cited

U.S. PATENT DOCUMENTS

| | | | |
|---|---|---|---|
| 7,747,122 B2 | 6/2010 | Shetrit et al. | |
| 10,185,205 B2 | 1/2019 | Popovic et al. | |
| 10,256,999 B2 * | 4/2019 | Ogata | H04B 10/40 |
| 10,277,008 B1 | 4/2019 | An | |
| 10,488,683 B1 * | 11/2019 | Doerr | G02F 1/0123 |
| 10,720,996 B2 * | 7/2020 | Mori | H04B 10/504 |

(Continued)

OTHER PUBLICATIONS

"Analytical Model and Fringing-Field Parasitics of Carrier-Depletion Silicon-on-Insulator Optical Modulation Diodes" by Jayatilleka et al, IEEE Photonics Journal, vol. 5, No. 1, paper 2200211 (Year: 2013).*

(Continued)

*Primary Examiner* — Robert Tavlykaev
(74) *Attorney, Agent, or Firm* — LRK Patent Law Firm

(57) ABSTRACT

A silicon-based optical modulator. An optical modulator of a Mach-Zehnder type includes an optical coupler configured to separate a single optical signal into two optical signals having same output power, two phase shifters having a PN junction through which the two optical signals separated through the optical coupler pass respectively, a plurality of electrodes configured to apply an electrical signal to the two phase shifters, and two PN diodes disposed between the two phase shifters and configured to adjust an operating bandwidth of the optical modulator. The optical signals respectively passing through the two phase shifters have phases that change as a width of a depletion region changes based on a magnitude of a reverse voltage provided to the two phase shifters through the electrodes and a refractive index changes.

15 Claims, 13 Drawing Sheets

(56) References Cited

U.S. PATENT DOCUMENTS

2012/0063714 A1 3/2012 Park et al.
2014/0110572 A1* 4/2014 Li .......................... G02F 1/025
                                                              250/227.23

OTHER PUBLICATIONS

Alireza Samani et al., "A Low-Voltage 35-GHz Silicon Photonic Modulator-Enabled 112-GB/s Transmission System", IEEE Photonics Journal, vol. 7, No. 3, Jun. 2015.
David Patel et al., "Silicon Photonic Segmented Modulator-Based Electro-Optic DAC for 100 GB/s PAM-4 Generation", IEEE Photonics Technology Letters, vol. 27, No. 23, Dec. 1, 2015.

* cited by examiner

SILICON-BASED OPTICAL MODULATOR

CROSS-REFERENCE TO RELATED APPLICATION(S)

This application claims the priority benefit of Korean Patent Application No. 10-2019-0113055, filed on Sep. 11, 2019, and Korean Patent Application No. 10-2019-0179195, filed on Dec. 31, 2019, in the Korean Intellectual Property Office, the disclosures of which are incorporated herein by reference for all purposes.

BACKGROUND

1. Field of the Invention

One or more example embodiments relate to an optical modulator, and more particularly, to a technology for improving an operation speed of a silicon-based optical modulator.

2. Description of Related Art

As the demand for integration of an optical transmitter-receiver is increasing greatly, silicon photonics (SiP) is also receiving a great deal of attention. Among various optical devices or components included in a SiP optical circuit, a mainly used one is a silicon-based optical modulator that performs an electro-optic (EO) conversion function. The silicon-based optical modulator may be classified into a Mach-Zehnder modulator (MZM) and a micro-ring modulator (MRM). The MZM may operate irrespective of a wavelength, and thus operate without an additional device for monitoring a wavelength.

There is a desire for a method of improving an operation speed of such a silicon-based optical modulator.

SUMMARY

An aspect provides a silicon-based optical modulator, and a method of improving an operation speed of the optical modulator by inserting a PN diode in the optical modulator and adjusting an operating bandwidth of the optical modulator.

According to an example embodiment, there is provided a Mach-Zehnder type optical modulator including an optical coupler configured to separate a single optical signal into two optical signals having same output power, two phase shifters having a PN junction through which the two optical signals separated through the optical coupler pass respectively, a plurality of electrodes configured to apply an electrical signal to the two phase shifters, and two PN diodes disposed between the two phase shifters and configured to adjust an operating bandwidth of the optical modulator. The optical signals respectively passing through the two phase shifters may have phases that change as a width of a depletion region changes based on a magnitude of a reverse voltage provided to the two phase shifters through the electrodes and a refractive index changes.

Each of the two phase shifters may include a slab region to receive the electrical signal applied by the electrodes.

The slab region may be doped at a doping concentration higher than that for a core of the two phase shifters having the PN junction.

The operating bandwidth and an applied driving voltage of the phase shifters may be adjusted based on a doping concentration of the two PN diodes disposed between the two phase shifters.

When the doping concentration of the two PN diodes is less than a doping concentration of the two phase shifters, the operating bandwidth may increase and the applied driving voltage of the phase shifters decrease, as a total capacitance of the optical modulator decreases.

When the doping concentration of the two PN diodes is greater than the doping concentration of the two phase shifters, the operating bandwidth may decrease and the applied driving voltage of the phase shifters increase, as the total capacitance of the optical modulator increases.

The optical modulator may be configured to match a speed of an electrical signal to be propagated through the electrodes and a speed of an optical signal to be propagated through the phase shifters to increase a modulation efficiency of the optical modulator.

According to another example embodiment, there is provided a ring-type optical modulator including a ring-type phase shifter having a PN junction through which an optical signal passes, a plurality of electrodes configured to apply an electrical signal to the phase shifter, and a PN diode disposed between the phase shifter and the electrodes and configured to adjust an operating bandwidth of the optical modulator. The optical signal passing through the phase shifter may have a phase that changes as a width of a depletion region changes based on a magnitude of a reverse voltage provided to the phase shifter through the electrodes and a refractive index changes.

The optical modulator may further include a thermal contact region to tune a wavelength of the optical signal to be input to the optical modulator, and a direct current (DC) bias contact region to provide an offset to the electrical signal to be applied to the phase shifter.

The phase shifter may include a slab region to receive the electrical signal applied by the electrodes.

The slab region may be doped at a doping concentration higher than that for a core of the phase shifter having the PN junction.

The operating bandwidth and an applied driving voltage of the phase shifter may be adjusted based on a doping concentration of the PN diode disposed between the phase shifter and the electrodes.

When the doping concentration of the PN diode is less than a doping concentration of the phase shifter, the operating bandwidth may increase and the applied driving voltage of the phase shifter may decrease, as a total capacitance of the optical modulator decreases.

When the doping concentration of the PN diode is greater than the doping concentration of the phase shifter, the operating bandwidth may decrease and the applied driving voltage of the phase shifter may increase, as the total capacitance of the optical modulator increases.

The optical modulator may be configured to match a speed of the electrical signal to be propagated through the electrodes and a speed of the optical signal to be propagated through the phase shifter to increase a modulation efficiency of the optical modulator.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION OF THE INVENTION

Figure 1A:
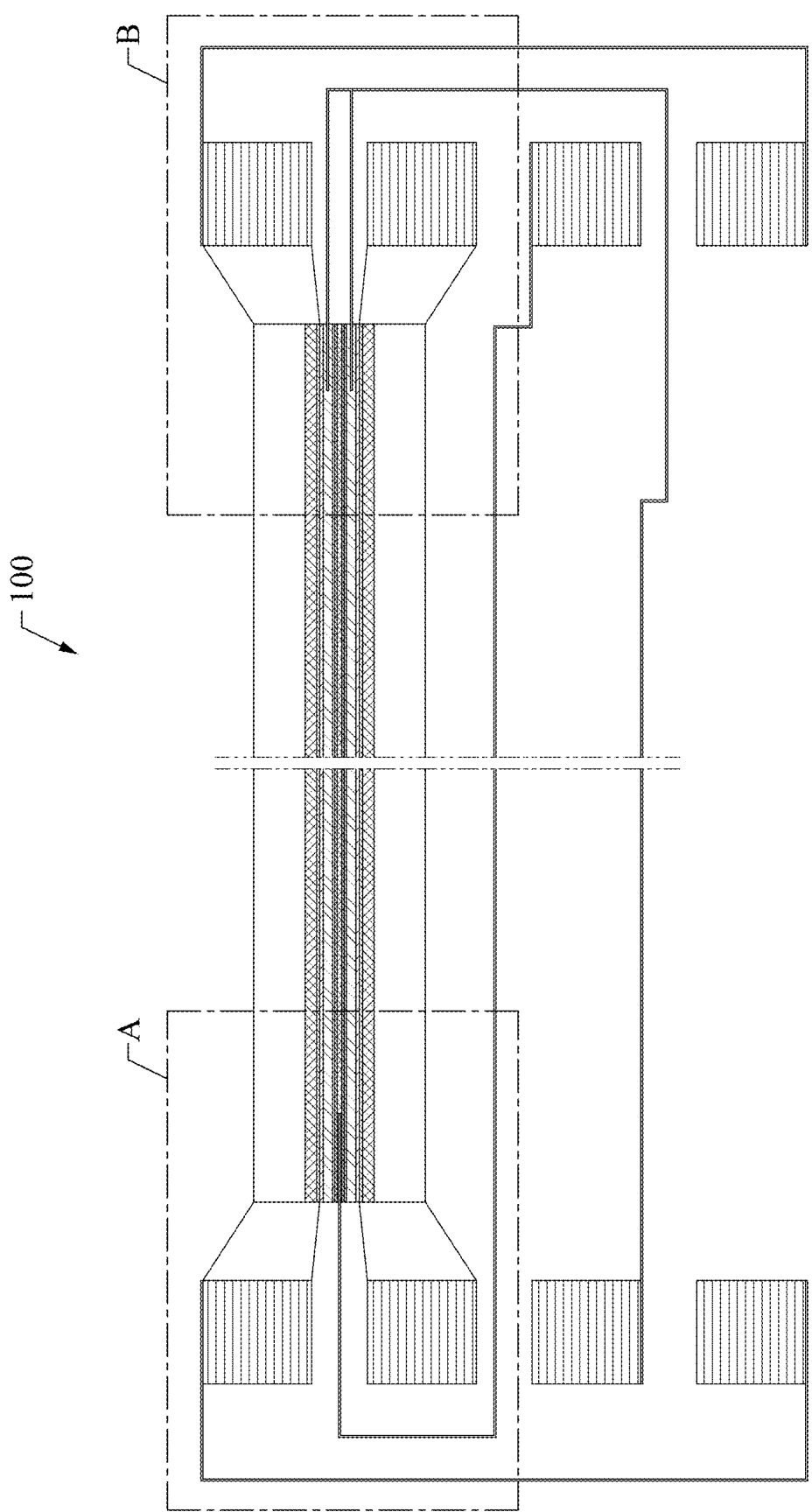
FIGS. 1A through 1C are diagrams illustrating an example of a structure of a Mach-Zehnder optical modulator according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, example embodiments will be described in detail with reference to the accompanying drawings.

Figure 1B:
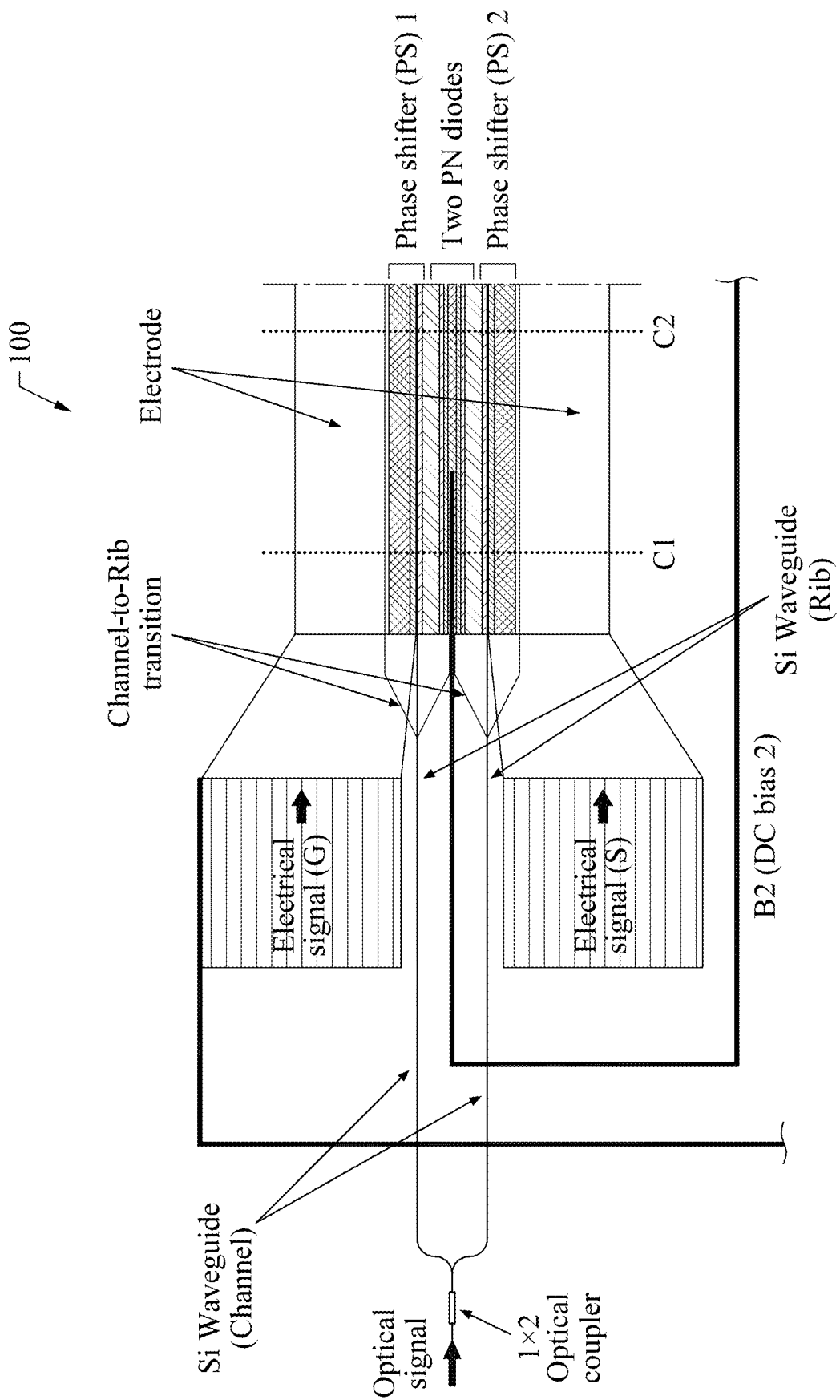
Figure 1C:
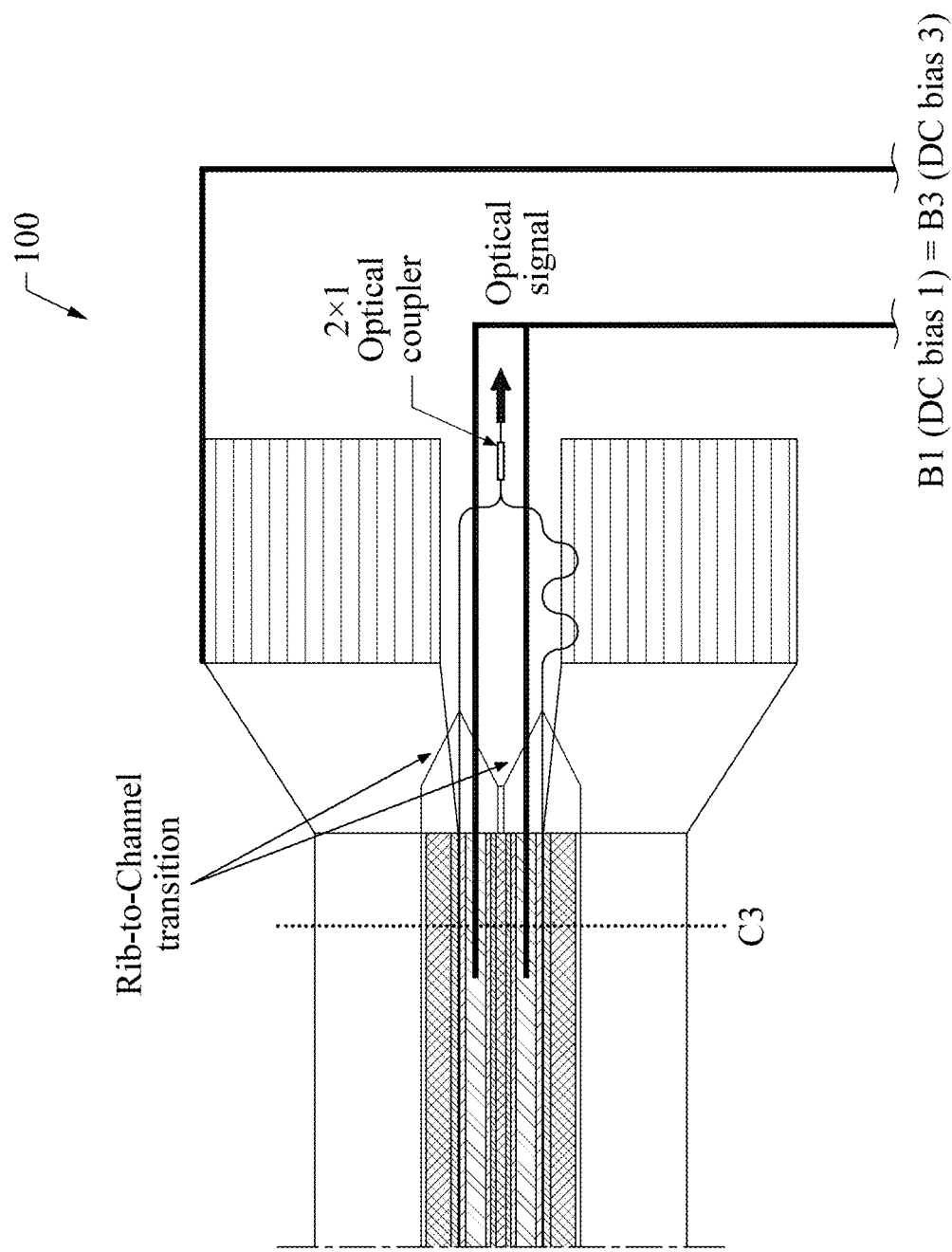

FIGS. 1A through 1C are diagrams illustrating an example of a structure of a Mach-Zehnder optical modulator according to an example embodiment.

FIG. 1A is a diagram illustrating an example of an entire structure of a silicon (Si)-based Mach-Zehnder optical modulator 100. FIG. 1B is an enlarged view illustrating a left portion A of the Mach-Zehnder optical modulator 100 illustrated in FIG. 1A, and FIG. 1C is an enlarged view illustrating a right portion B of the Mach-Zehnder optical modulator 100 illustrated in FIG. 1A.

Referring to FIG. 1B, when an external optical signal is input to an input port of a 1×2 optical coupler, the optical signal may be separated into two optical signals having optical output power of a same rate and the separated two optical signals may be output to respective output ports of the optical coupler. A channel-type Si waveguide disposed at a rear end of the optical coupler may be transformed into a rib-type Si waveguide having two paths. The optical signals respectively passing through the two paths of the rib-type Si waveguide may pass through a phase shifter (PS), and optical modulation may be performed while the optical signals are passing through the phase shifter.

In detail, the phase shifter may be doped by N-type and P-type impurities in the rib-type Si waveguide, and may shift a phase of an optical signal passing therethrough by an optical property from a change in an NP concentration occurring when an electric field is applied.

The Mach-Zehnder optical modulator 100 further includes two electrodes. When an external ground-signal (GS) signal is input through an electrode pad and then propagated through the electrodes respectively, an electrical signal may be applied to each of two phase shifters, for example, PS1 and PS2 as illustrated. Here, by matching a propagation speed of an electrical signal to be propagated through the electrodes and a propagation speed of an optical signal to pass through the two phase shifters PS1 and PS2, the Mach-Zehnder optical modulator 100 may obtain a maximum modulation efficiency.

The Mach-Zehnder optical modulator 100 includes two PN diodes that are additionally inserted between the phase shifters PS1 and PS2 on two optical paths. Between the two PN diodes, a direct-current (DC) bias electrode B2 having a narrow width may be disposed, and thus a DC bias voltage may be applied between the two PN diodes.

Referring to FIG. 1C, the Mach-Zehnder optical modulator 100 may be provided in a structure in which optical signals of which respective phases are shifted by the two phase shifters PS1 and PS2 pass through a rib-to-channel transition unit and then are combined through a 2×1 optical coupler to be output. In the Mach-Zehnder optical modulator 100, a DC bias electrode B1 may be disposed between the phase shifter PS1 and a PN diode (one of the two PN diodes) and a DC bias electrode B3 may be disposed between the phase shifter PS2 and a PN diode (the other one of the two PN diodes), and thus a DC bias voltage may be applied thereto.

FIGS. 2A through 2D are diagrams illustrating an example of a cross-section of a Mach-Zehnder optical modulator according to an example embodiment.

Figure 2A:
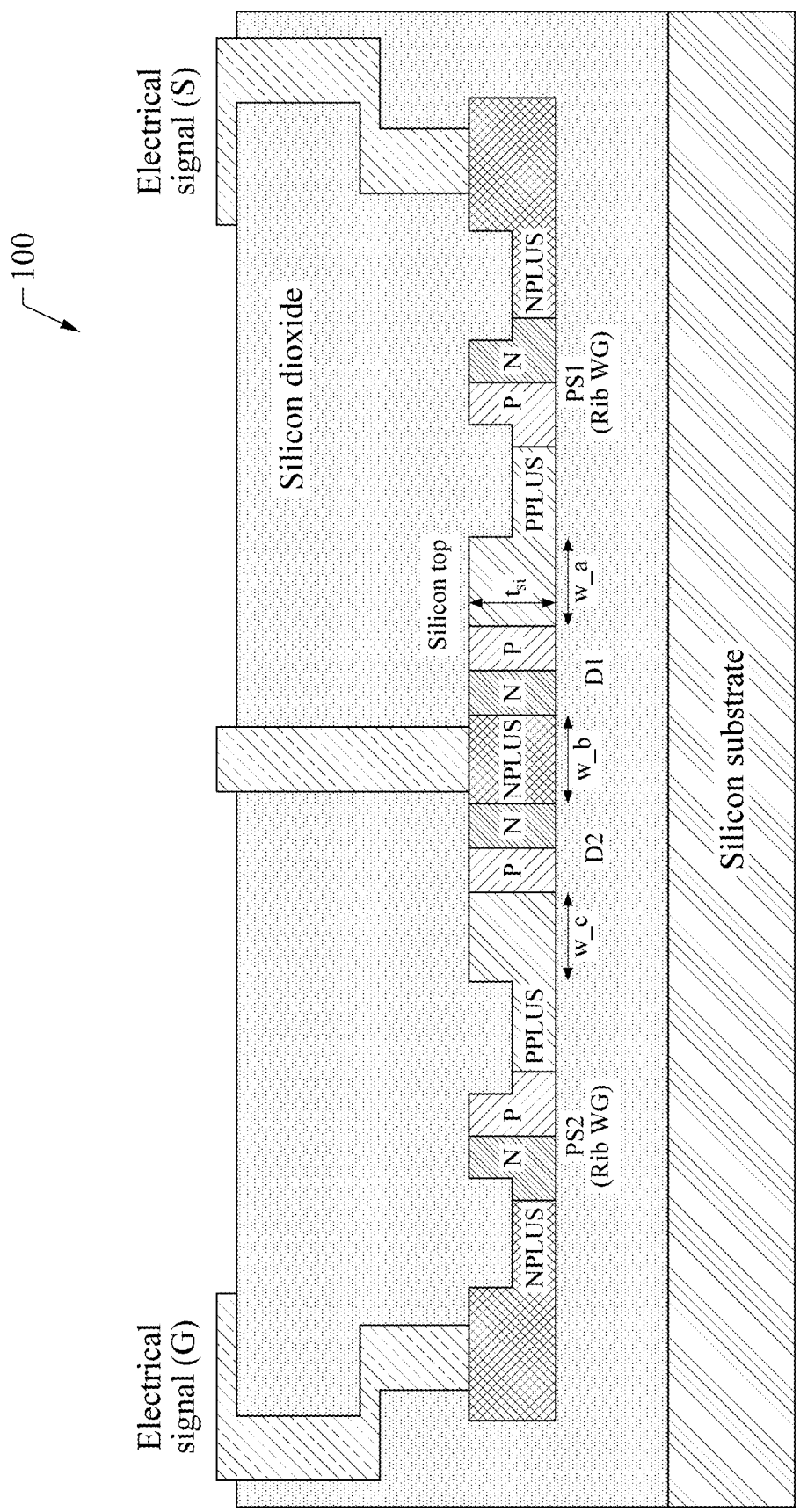
FIGS. 2A through 2D are diagrams illustrating an example of a cross-section of a Mach-Zehnder optical modulator according to an example embodiment.
Figure 2B:
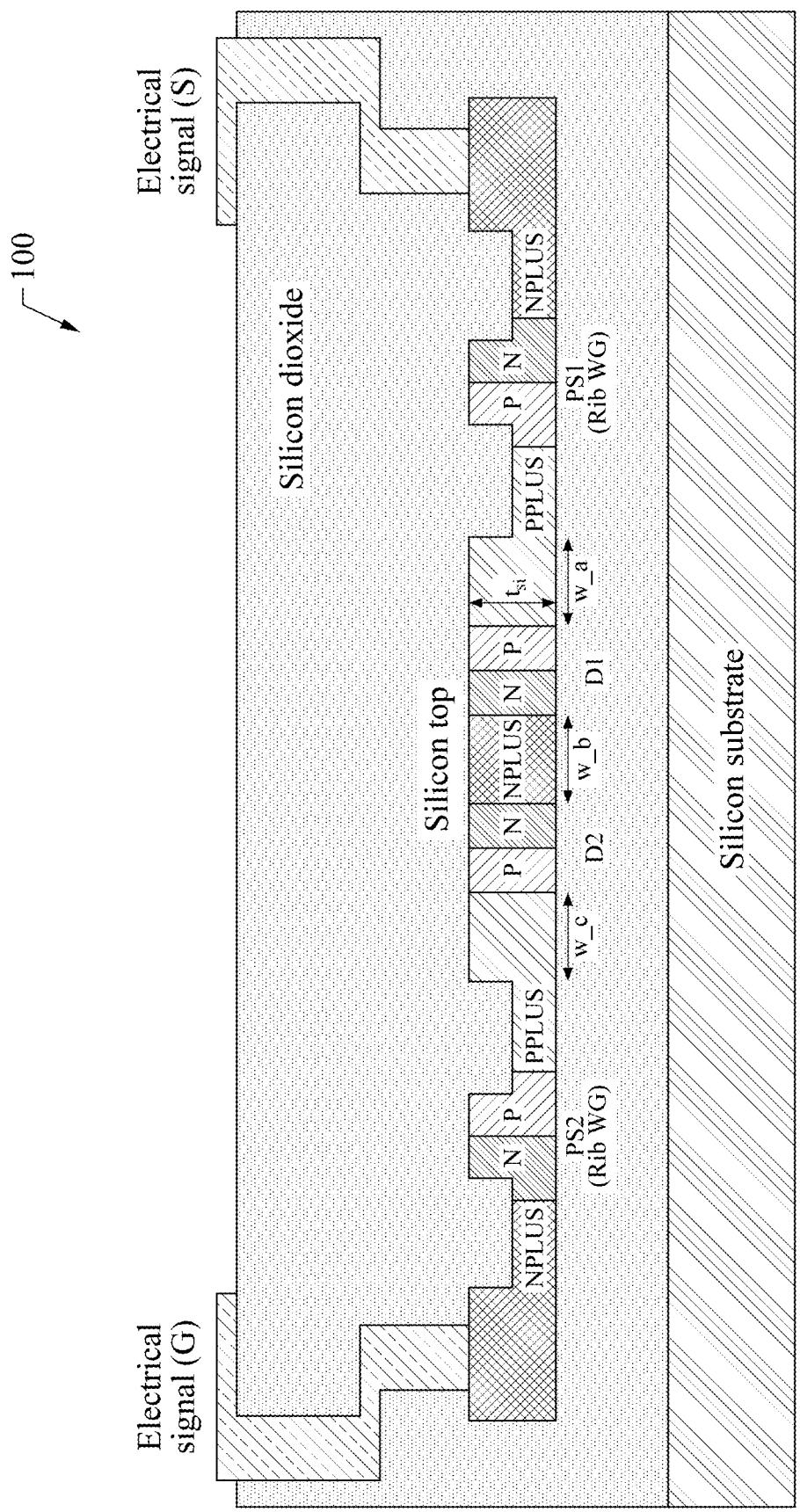
Figure 2C:
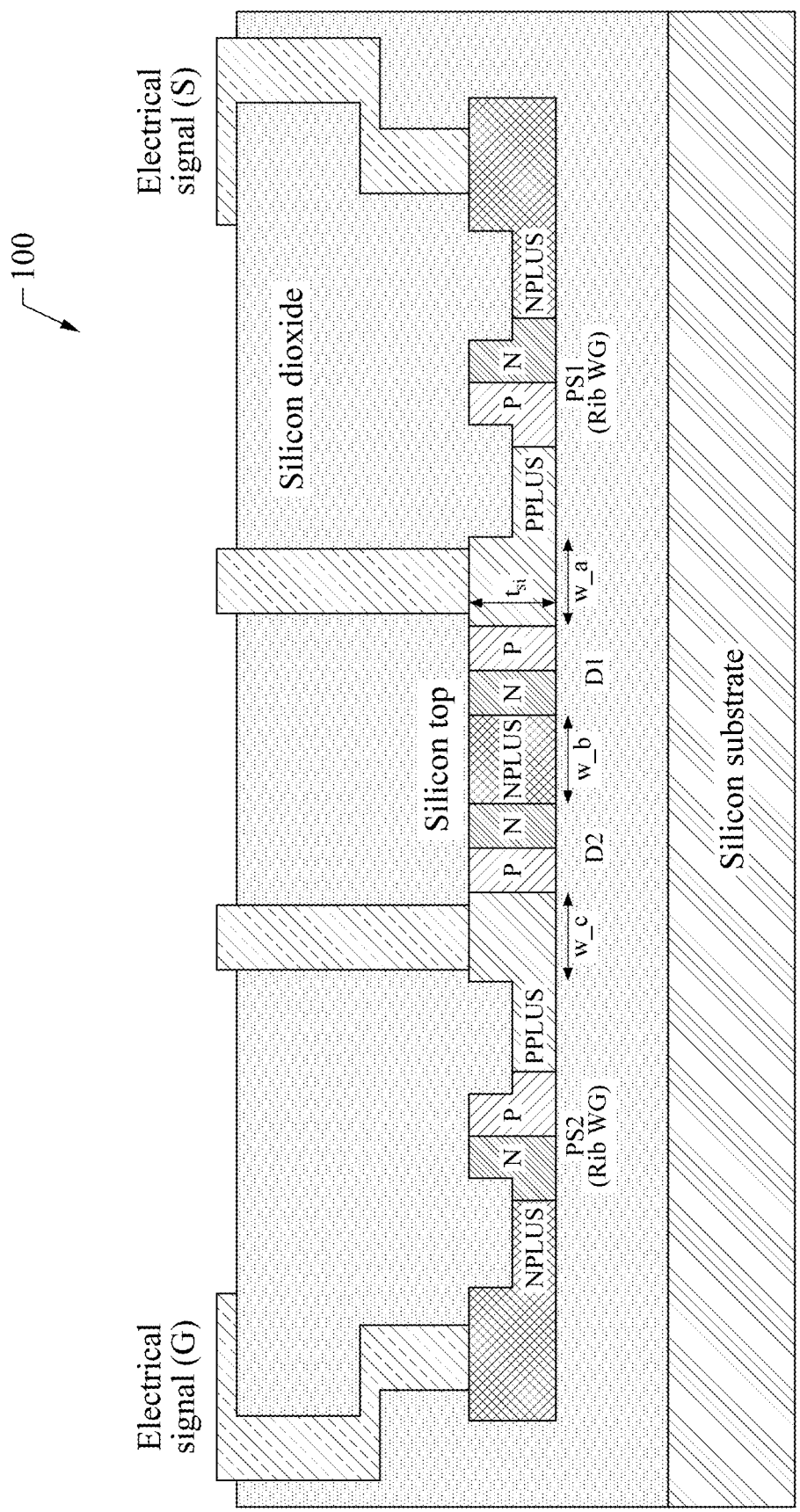

FIG. 2A is a partial cross-sectional view illustrating a portion C1 of the Si-based Mach-Zehnder optical modulator 100 illustrated in FIG. 1B. FIG. 2B is a partial cross-sectional view illustrating a portion C2 of the Si-based Mach-Zehnder optical modulator 100 illustrated in FIG. 1B. FIG. 2C is a partial cross-sectional view illustrating a portion C3 of the Si-based Mach-Zehnder optical modulator 100 illustrated in FIG. 1C.

The portion C1 of the Mach-Zehnder optical modulator 100 may be a portion in contact with the DC bias electrode B2, and the portion C2 of the Mach-Zehnder optical modulator 100 may be a portion not in contact with a DC bias electrode. Even without the contact with a DC bias electrode in the Mach-Zehnder optical modulator 100, a DC bias voltage may be transmitted to a semiconducting region having a high doping concentration of PPLUS or NPLUS. In addition, the portion C3 of the Mach-Zehnder optical modulator 100 may be a portion in contact with the other two DC bias electrodes B1 and B3. For example, an optical modulator may be embodied not only in an NPNPN structure but also in a PNPNP structure.

Figure 2D:
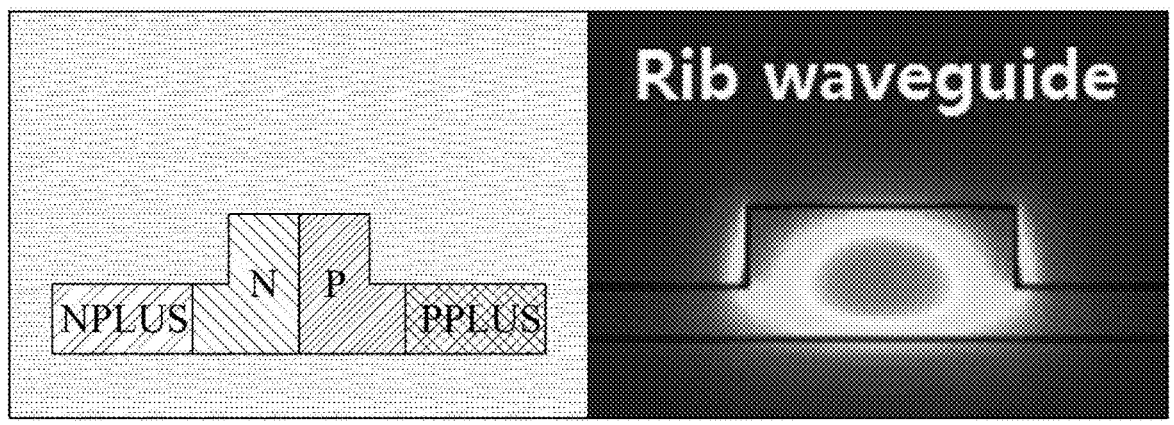

In the Mach-Zehnder optical modulator 100, two PN diodes D1 and D2 may be additionally inserted and disposed between phase shifters PS1 and PS2 disposed on a Si substrate and a silicon dioxide ($SiO_2$) layer. The phase shifters PS1 and PS2 may be provided in a form of a rib waveguide and thus propagate an optical signal, and optical power of the optical signal to be propagated may be concentrated mainly in a core portion of the rib waveguide as illustrated in FIG. 2D. The core portion may be doped with N-type and P-type impurities and have a PN junction. When a reverse voltage is applied to the phase shifters PS1 and PS2, a width of a depletion region may change based on a magnitude of the reverse voltage, and a refractive index which is one of optical properties may change. Thus, a phase of the optical signal passing through the phase shifters PS1 and PS2 may change, thereby allowing the Mach-Zehnder optical modulator 100 to operate as an optical modulator.

A slab may function as a path for an electrical signal applied by an electrode included in the Mach-Zehnder optical modulator 100 to pass from the electrode to the phase shifters PS1 and PS2. When resistance of the slab decreases, the electrical signal may reach the phase shifters PS1 and PS2 more smoothly. Thus, the slab may need to be doped with NPLUS and PPLUS at a considerably higher doping concentration than a doping concentration for a core. However, when the NPLUS and PPLUS doping is performed up to the core to decrease the resistance greatly, a loss of the optical signal in the rib waveguide may increase greatly due to free carrier absorption (FCA). Thus, the NPLUS and PPLUS doping may be performed only up to a region where there is almost no optical power. Here, when a thickness $t_{slab}$ of the slab increases in order to decrease the electric resistance, the optical power may not be confined to the core of the rib waveguide and may leak out. Thus, it may not be desirable to simply increase the thickness $t_{slab}$ in order to decrease the electric resistance.

The PN diodes D1 and D2 included in the Mach-Zehnder optical modulator 100 may not propagate the optical signal, and affect only on an electrical operation of the Mach-Zehnder optical modulator 100. Thus, such a slab may not need to be provided to the PN diodes D1 and D2. That is, increasing the thickness $t_{slab}$ of the slab to $t_{Si}$ may be possible, and thus the resistance may be extremely small. In addition, the PN diodes D1 and D2 may not be a region by which the optical signal is propagated and FCA may not occur, and it may thus be possible to dope a broad region with low-resistance NPLUS or PPLUS. That is, it may be possible to increase widths W_a, W_b, and W_c to the maximum, and embody resistances $R_1'$ and $R_2'$ of the PN diodes D1 and D2 to be extremely small. In addition, through NP doping at a similar concentration, it may be possible to embody capacitances $C_1'$ and $C_2'$ of the PN diodes D1 and D2 to be similar levels to those of the phase shifters PS1 and PS2.

Figure 3A:
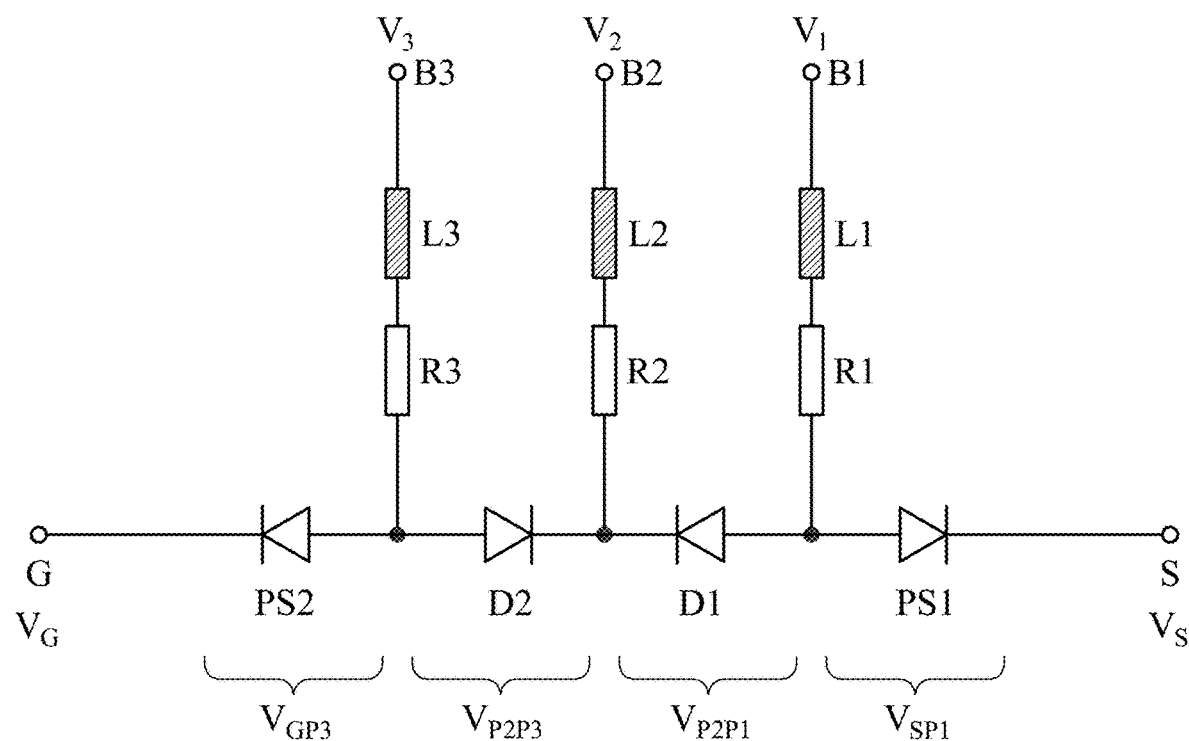
FIGS. 3A through 3C are diagrams illustrating an example of an electrical model of a Mach-Zehnder optical modulator according to an example embodiment.
Figure 3B:
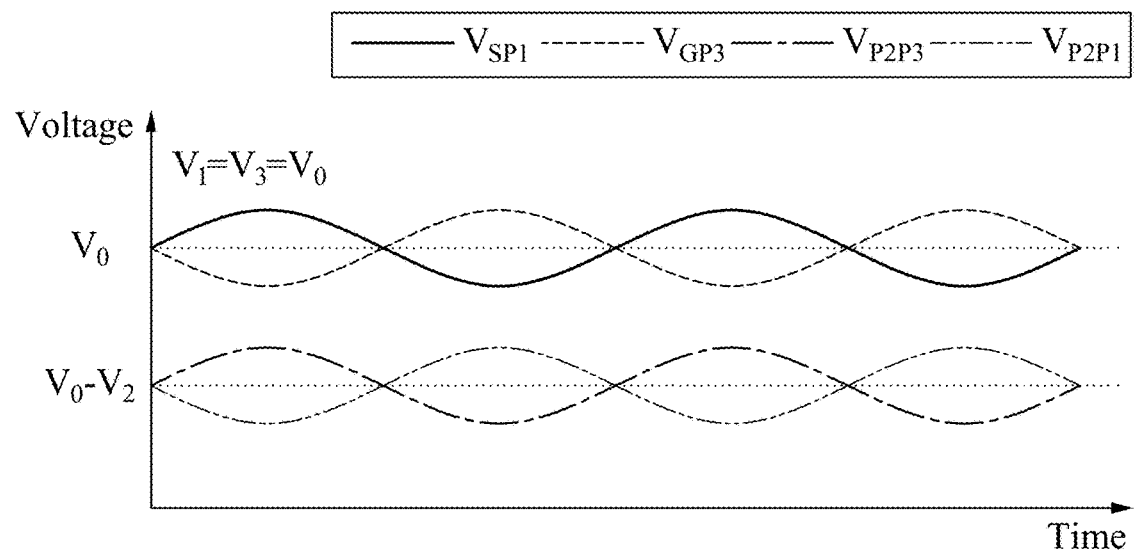
Figure 3C:
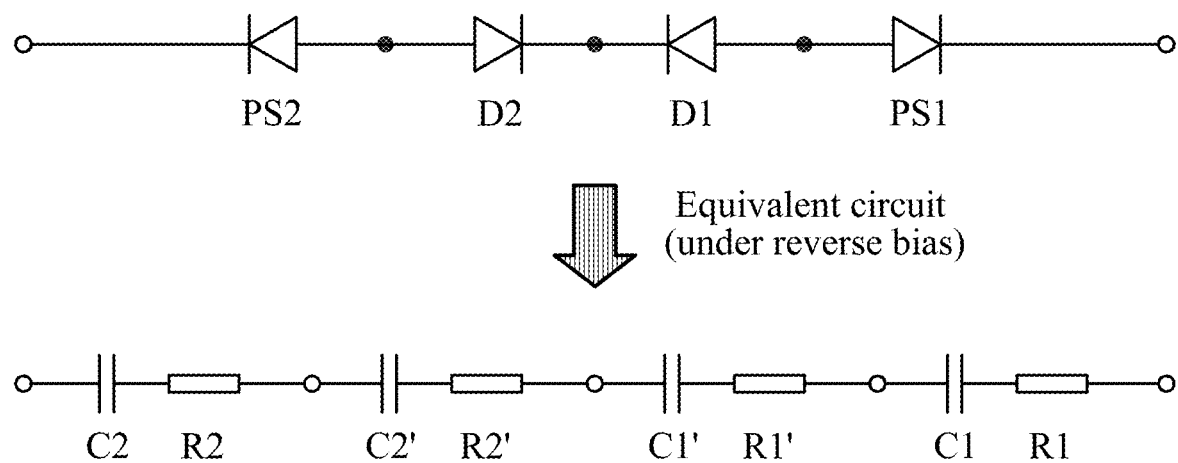

FIGS. 3A through 3C are diagrams illustrating an example of an electrical model of a Mach-Zehnder optical modulator according to an example embodiment.

FIG. 3A is a diagram illustrating an electrical model of a Mach-Zehnder optical modulator. Two phase shifters PS1 and PS2 may be modeled as PN juncture diodes, between which PN diodes D1 and D2 are connected. A DC bias electrode with a narrow electrode width may be modeled as a port connected with high resistance and inductance. For example, as illustrated, the modeling may be performed such that a DC bias port B1 may be connected between the phase shifter PS1 and the PN diode D1, a DC bias port B2 may be connected between the PN diode D1 and the PN diode D2, and a DC bias port B3 may be connected between the phase shifter PS2 and the PN diode D2.

For an applied voltage, $V_S=(V_{pp}/2)\times\sin(\omega t)$, $V_{B1}=-V_1$, $V_{B2}=-V_2$, and $V_{B3}=-V_3$, and $V_G=0$. When a source voltage is a peak having a positive value ($@V_S=V_{pp}/2$), a voltage to be applied to each of the phase shifters and the PN diodes may be as represented by Equation 1 below. Here, it is assumed that a phase shifter and a PN diode are doped at a same concentration.

Phase shifter PS1: $V_{SP1}=V_S-V_{P1}=\frac{1}{2}V_{pp}-(\frac{3}{8}V_{pp}-V_1)$
$=V_1+\frac{1}{8}V_{pp}$ PN diode D1: $V_{P2P1}=V_{P2}-V_{P1}=(\frac{2}{8}V_{pp}-V_2)-(\frac{3}{8}V_{pp}-V_1)=V_1-V_2-\frac{1}{8}V_{pp}$ PN diode D2: $V_{P2P3}=V_{P2}-V_{P3}=(\frac{2}{8}V_{pp}-V_2)-(\frac{1}{8}V_{pp}-V_3)=-V_2-V_3-\frac{1}{8}V_{pp}$ Phase shifter PS2: $V_{GP3}=V_G-V_{P3}=0-(\frac{1}{8}V_{pp}-V_3)=+V_3+\frac{1}{8}V_{pp}$ Equation 1

In addition, when the source voltage is a peak having a negative value ($@V_S=-V_{pp}/2$), a voltage to be applied to each of the phase shifters and the PN diodes may be as represented by Equation 2 below.

Phase shifter PS1: $V_{SP1}=V_S-V_{P1}=-\frac{1}{2}V_{pp}-(-\frac{3}{8}V_{pp}-V_1)=V_1-\frac{1}{8}V_{pp}$ PN diode D1: $V_{P2P1}=V_{P2}-V_{P1}=(-\frac{2}{8}V_{pp}-V_2)-(-\frac{3}{8}V_{pp}-V_1)=V_1-V_2+\frac{1}{8}V_{pp}$ PN diode D2: $V_{P2P3}=V_{P2}-V_{P3}=(-\frac{2}{8}V_{pp}-V_2)-(-\frac{1}{8}V_{pp}-V_3)=-V_2+V_3-\frac{1}{8}V_{pp}$ Phase shifter PS2: $V_{GP3}=V_G-V_{P3}=0-(-\frac{1}{8}V_{pp}-V_3)=+V_3+\frac{1}{8}V_{pp}$ Equation 2

Here, a push-pull operation may be performed on the two phase shifters PS1 and PS2 such that voltages with a magnitude of $V_{pp}/8$ and opposite signs may be applied to the two phase shifters PS1 and PS2. Thus, an effective voltage difference may be $V_{pp}/4$, which is a two-fold decrease in an effective voltage difference of an existing series push-pull (SPP) Mach-Zehnder modulator (MZM). This is because a voltage is distributed and applied even to the PN diodes D1 and D2 connected in series between the two phase shifters PS1 and PS2.

A condition for a reverse voltage to be permanently applied in the equations described above may be represented by Equation 3 below.

(i) $V_1>V_2$, (ii) $V_3>V_2$, (iii) $V_1\pm\frac{1}{8}V_{pp}>0$, (iv) $V_1-V_2\pm\frac{1}{8}V_{PP}>0$, (v) $-V_2+V_3\pm\frac{1}{8}V_{PP}>0$, (iv) $V_3\pm\frac{1}{8}V_{pp}>0$ Equation 3

FIG. 3B is a diagram illustrating a voltage to be applied to the Mach-Zehnder optical modulator 100 based on a time under the condition that $V_1=V_3=V_0$ in which $V_0$ is greater than $V_2$ ($V_0>V_2$). For example, a voltage having a maximum amplitude of $V_{pp}/4$ based on $V_0$ may be applied to the phase shifters PS1 and PS2, and a voltage having a maximum relative difference of $V_{pp}/4$ based on $V_0-V_2$ may be applied to the PN diodes D1 and D2. When $V_2=0$, all illustrated by four lines of a graph in FIG. 3B may have the maximum amplitude of $V_{pp}/4$ based on $V_0$.

FIG. 3C is a diagram illustrating an electrical equivalent model of the Mach-Zehnder optical modulator 100. The phase shifters PS1 and PS2 may be equivalently modeled as a capacitor and a resistor at a reverse voltage, as with the PN diodes D1 and D2. Here, the phase shifters PS1 and PS2, and the PN diodes D1 and D2 may have respective capacitance and resistance values $C_1$, $C_2$, $C_1'$, $C_2'$, $R_1$, $R_2$, $R_1'$, and $R_2'$, as illustrated. Here, four diodes are connected in series, and thus a total capacitance and a total resistance may be represented by $$C = \frac{C_1 C_2 C_1' C_2'}{C_2 C_1' C_2' + C_1 C_1' C_2' + C_1 C_2 C_2' + C_1 C_2 C_1'}$$

and $R=R_1+R_2+R_1'+R_2'$, respectively. As described above, the phase shifters PS1 and PS2 and the PN diodes D1 and D2 may have similar capacitance values through NP doping at a similar concentration. For example, when $C_1 \approx C_2 \approx C_1' \approx C_2' \approx C_0$, the capacitance may be reduced to $C=\frac{1}{4}C_0$. However, the PN diodes D1 and D2 may not propagate an optical signal, and thus be designed to have an extremely small resistance value R, for example $R_1 \approx R_2 \gg R_1' \approx R_2'$. Thus, in $\tau=RC$, the capacitance is reduced by a factor of two times while the resistance R increases slightly, and it may thus be possible to reduce a time constant greatly and increase a bandwidth of the Mach-Zehnder optical modulator 100 accordingly.

As represented by the equations above, the phase shifters PS1 and PS2 and the PN diodes D1 and D2 may be embodied at a similar concentration to have a similar capacitance, and thus be divided by a same voltage $V_{pp}/8$. However, by adjusting the concentration, an operating bandwidth and an applied driving voltage may be tuned. For example, by decreasing an NP concentration of the PN diodes D1 and D2 to be less than an NP concentration of the phase shifters PS1 and PS2, a width of a depletion region of the PN diodes D1 and D2 may increase and a capacitance may decrease accordingly, and impedance may increase. Since a total capacitance of the Mach-Zehnder optical modulator 100 decreases, the operating bandwidth of the Mach-Zehnder optical modulator 100 may increase. However, a greater voltage may be applied to the PN diodes D1 and D2, and thus a voltage less than $V_{pp}/8$ may be applied to the phase shifters PS1 and PS2.

Conversely, by increasing the NP concentration of the PN diodes D1 and D2 to be greater than the NP concentration of the phase shifters PS1 and PS2, the width of the depletion region of the PN diodes D1 and D2 may decrease and the capacitance may increase accordingly, and the impedance may decrease. Since the total capacitance of the Mach-Zehnder optical modulator 100 increases, the operating bandwidth of the Mach-Zehnder optical modulator 100 may decrease. However, a smaller voltage may be applied to the PN diodes D1 and D2, and thus a voltage greater than $V_{pp}/8$ may be applied to the phase shifters PS1 and PS2.

Figure 4A:
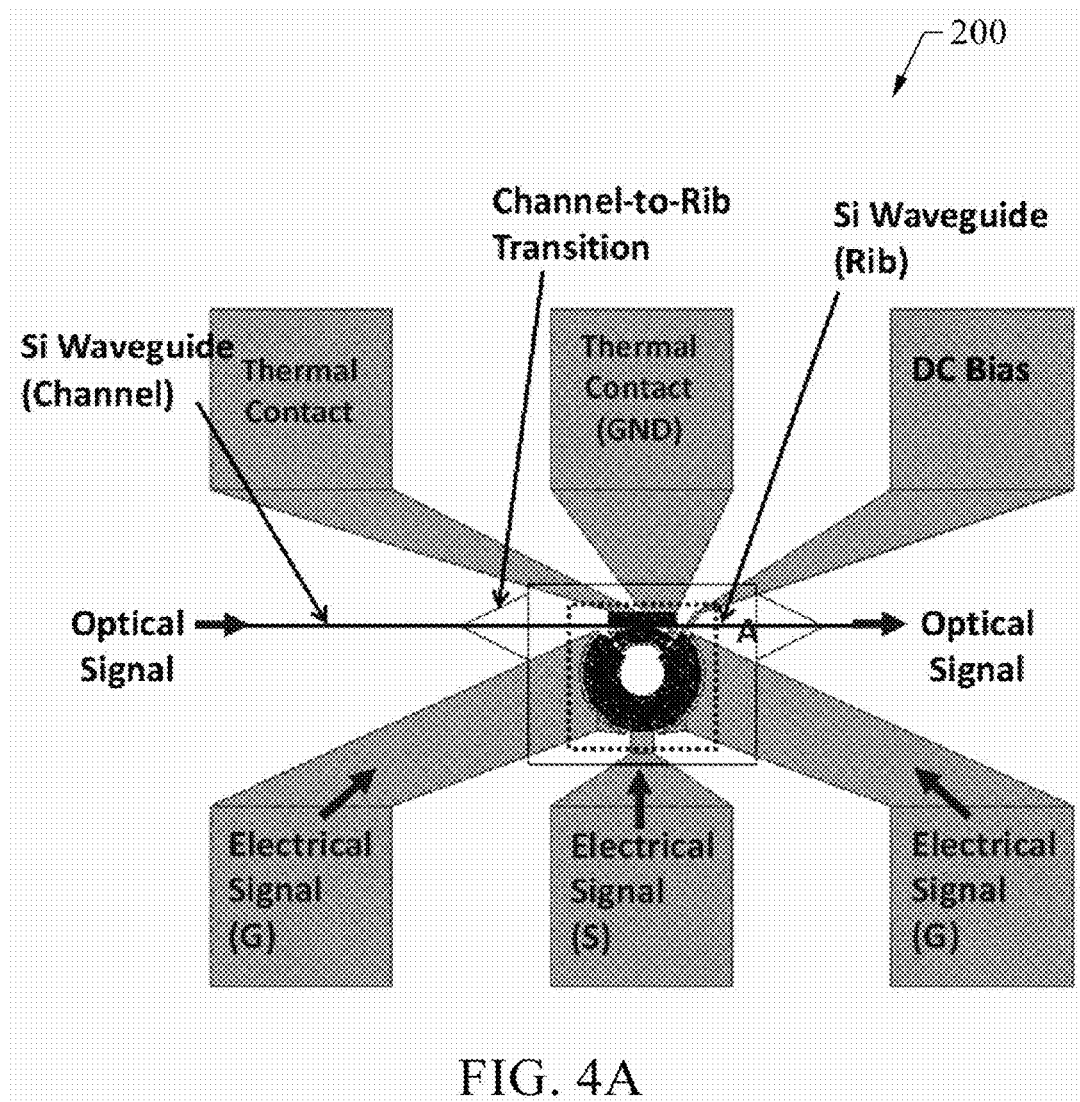
FIGS. 4A and 4B are diagrams illustrating an example of a structure of a micro-ring optical modulator according to an example embodiment.
Figure 4B:
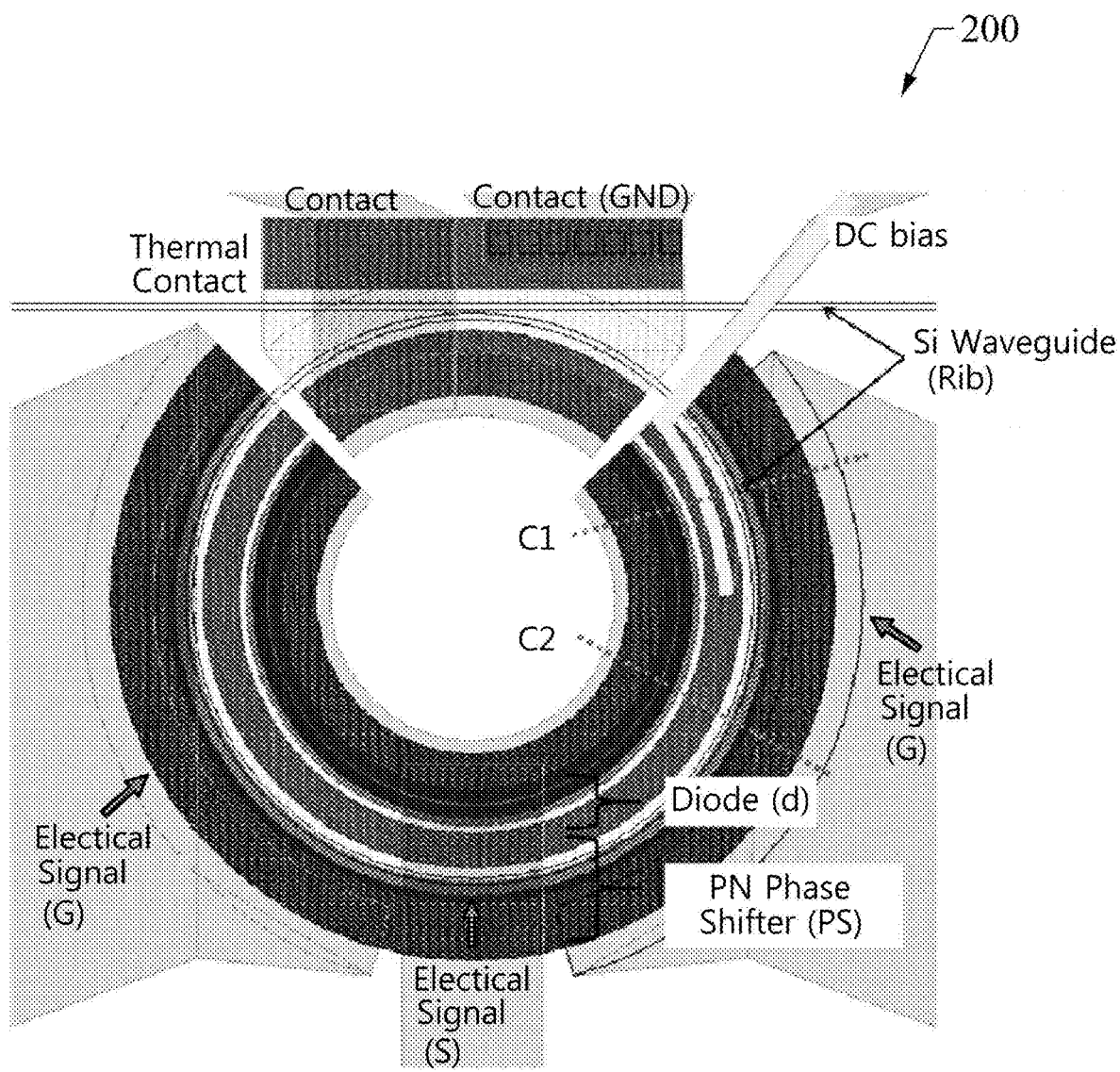

FIGS. 4A and 4B are diagrams illustrating an example of a structure of a micro-ring optical modulator according to an example embodiment.

FIG. 4A is a diagram illustrating an entire structure of a Si-based micro-ring optical modulator 200, and FIG. 4B is an enlarged view illustrating a central portion A of the micro-ring optical modulator 200 illustrated in FIG. 4A.

The Mach-Zehnder optical modulator 100 described herein may be designed to receive an applied external GS signal. The micro-ring optical modulator 200 may be provided in a structure to which a GSG signal is applied. In detail, an optical signal input through a Si photonic channel waveguide may pass through a channel-rib transition unit, and then be input to a ring-type phase shifter. The phase shifter may be doped with N-type and P-type impurities in a Si photonic rib waveguide as in the Mach-Zehnder optical modulator 100.

Referring to FIG. 4B, the micro-ring optical modulator 200 may have two thermal contact regions for matching wavelengths and a single DC bias contact region. The external GSG signal may be input through an electrode pad, and an electrical signal may be applied to the phase shifter and an added PN diode D. In detail, only a specific wavelength may pass through the micro-ring optical modulator 200. Thus, in a case in which wavelengths are different when light is input to the micro-ring optical modulator 200 from an external light source, an operating wavelength of the micro-ring optical modulator 200 may need to be tuned. In general, when electricity, for example, a DC, is applied to the thermal contact regions of the micro-ring optical modulator 200, heat may be generated due to a flowing current. Due to the generated heat, a refractive index of the micro-ring optical modulator 200 may change and a pass wavelength may also change. Thus, the tuning may be enabled as described above. In addition, the DC bias contact region may be used to apply an offset to a radio frequency (RF) electrical signal. Although a DC voltage is applied also to the thermal contact regions used for the wavelength tuning, a DC voltage may be separately applied to the DC bias contact region to apply the offset.

Figure 5A:
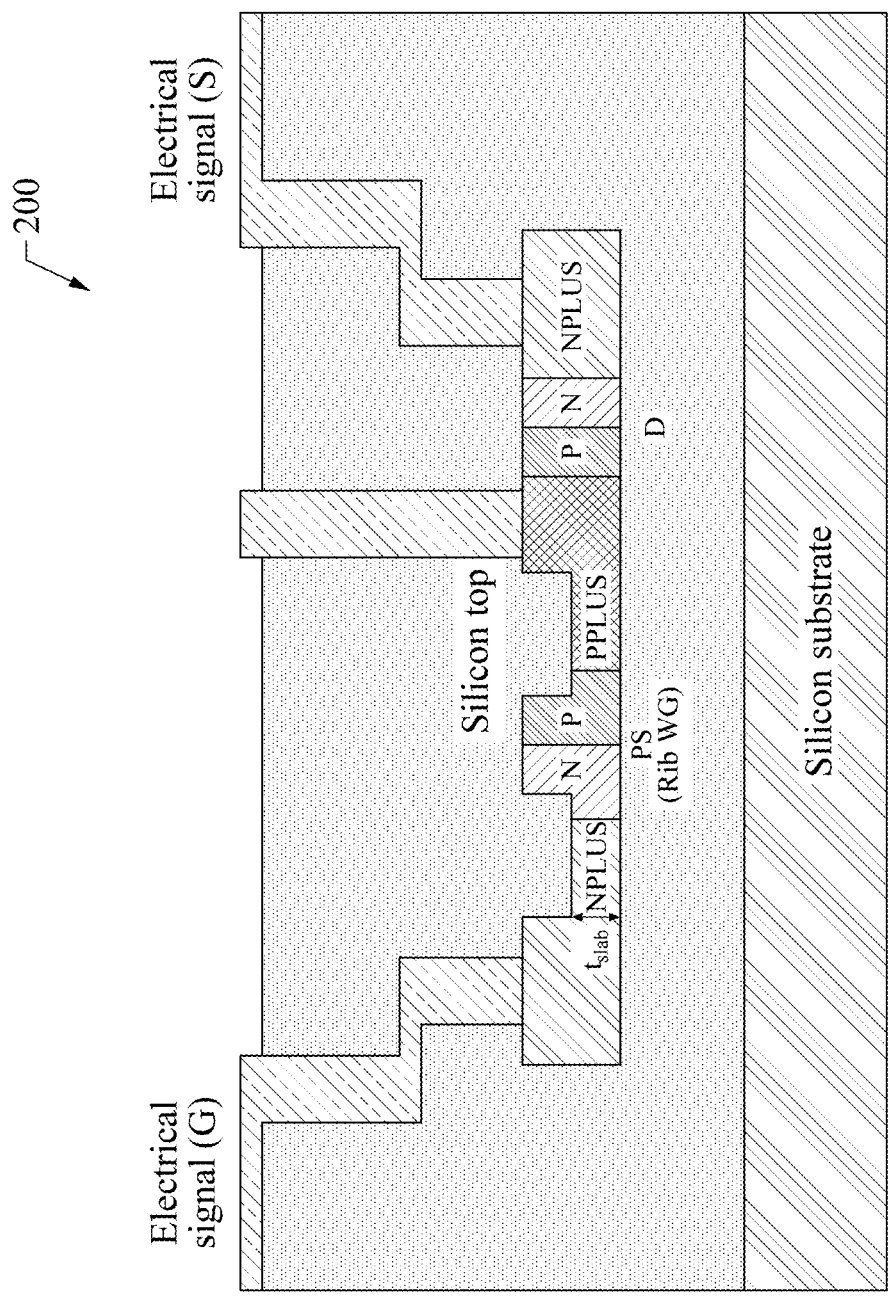
FIGS. 5A and 5B are diagrams illustrating an example of a cross-section of a micro-ring optical modulator according to an example embodiment.
Figure 5B:
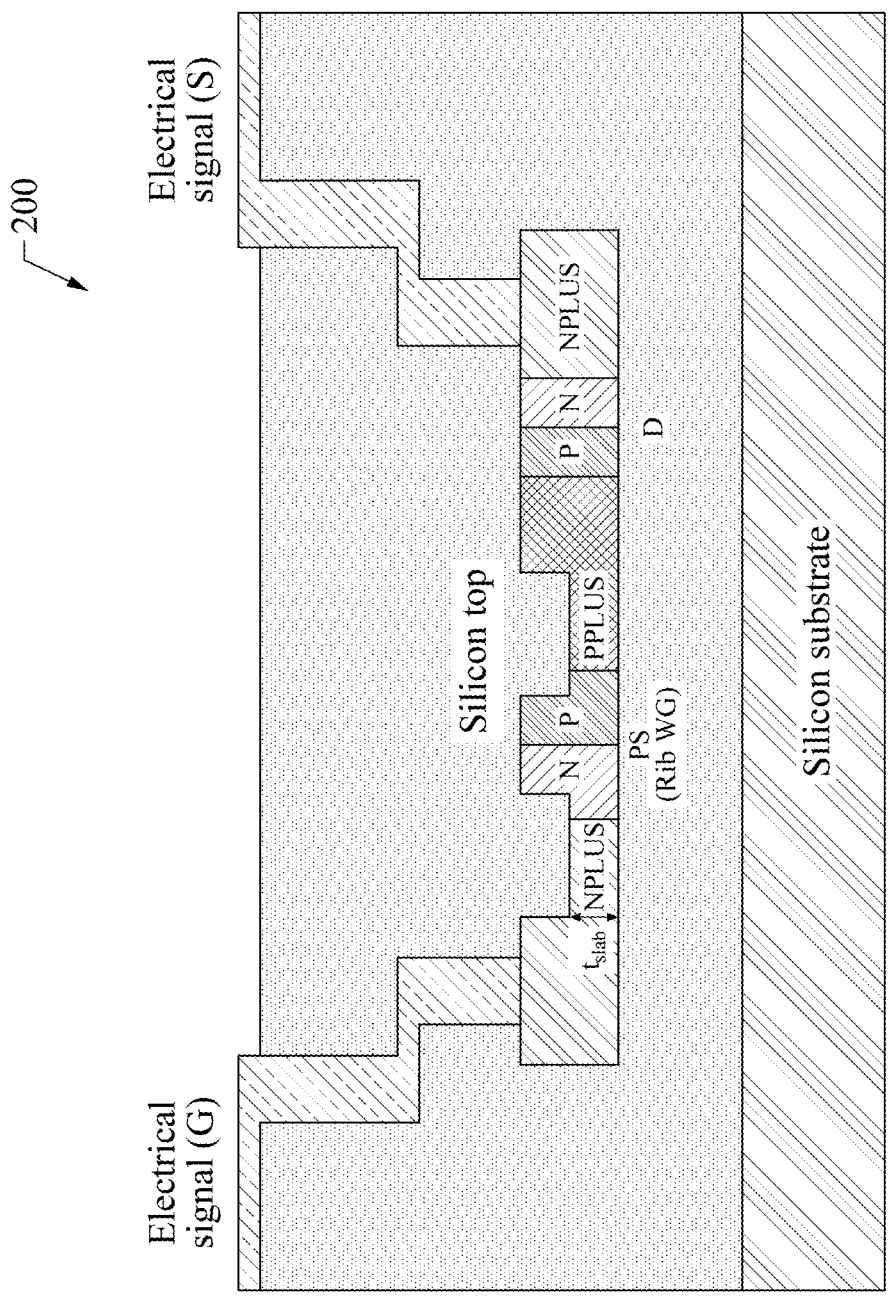

FIGS. 5A and 5B are diagrams illustrating an example of a cross-section of a micro-ring optical modulator according to an example embodiment.

FIG. 5A is a partial cross-sectional view illustrating a portion C1 of the Si-based micro-ring optical modulator 200 illustrated in FIG. 4B, and FIG. 5B is a partial cross-sectional view illustrating a portion C2 of the Si-based micro-ring optical modulator 200 illustrated in FIG. 4B.

The phase shifter PS may be in a form of a rib waveguide, and may thus propagate an optical signal. The PN diode D may not propagate the optical signal, and affect only on an electrical operation of the micro-ring optical modulator 200. By designing resistance R of the PN diode D to be extremely small and applying NP doping at a similar concentration, it may be possible to obtain capacitance C' of the PN node D to be a similar level to that of the phase shifter PS. Similarly to the Mach-Zehnder optical modulator 100, it may be possible to reduce the capacitance by a factor of approximately two times while increasing the resistance slightly, and thus reduce an RC time and accordingly increase an operating bandwidth of the micro-ring optical modulator 200.

According to example embodiments described herein, there is provided a silicon-based optical modulator, and a method of improving an operation speed of the optical modulator by inserting a PN diode in the optical modulator and adjusting an operating bandwidth of the optical modulator.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optical modulator of a Mach-Zehnder type, comprising:
   an optical coupler configured to separate a single optical signal into two optical signals having equal powers;
   two phase shifters each having a PN junction through which one of the two optical signals separated through the optical coupler passes, respectively;
   a plurality of electrodes configured to apply an electrical signal to the two phase shifters; and
   two PN diodes disposed between the two phase shifters and configured to adjust an operating bandwidth of the optical modulator,
   wherein the two optical signals respectively passing through the two phase shifters have phases that change as a width of a depletion region changes based on a magnitude of a reverse voltage provided to the two phase shifters through the electrodes and a refractive index changes.

2. The optical modulator of claim 1, wherein each of the two phase shifters comprises a slab region to receive the electrical signal applied by the electrodes.

3. The optical modulator of claim 2, wherein each slab region is doped at a doping concentration higher than that for a core of each phase shifter having the PN junction.

4. The optical modulator of claim 1, wherein the operating bandwidth and an applied driving voltage of the phase shifters are adjusted based on a doping concentration of the two PN diodes disposed between the two phase shifters.

5. The optical modulator of claim 4, wherein, when the doping concentration of the two PN diodes is less than a doping concentration of the two phase shifters, the operating bandwidth increases and the applied driving voltage of the phase shifters decreases, as a total capacitance of the optical modulator decreases.

6. The optical modulator of claim 4, wherein, when the doping concentration of the two PN diodes is greater than a doping concentration of the two phase shifters, the operating bandwidth decreases and the applied driving voltage of the phase shifters increases, as a total capacitance of the optical modulator increases.

7. The optical modulator of claim 1, configured to match a speed of an electrical signal to be propagated through the electrodes and a speed of an optical signal to be propagated through the phase shifters and to thereby increase a modulation efficiency of the optical modulator.

8. An optical modulator of a ring type, comprising:
   a phase shifter of a ring type having a PN junction through which an optical signal passes;
   a plurality of electrodes configured to apply an electrical signal to the phase shifter; and
   a PN diode disposed between the phase shifter and the electrodes and configured to adjust an operating bandwidth of the optical modulator,
   wherein the optical signal passing through the phase shifter has a phase that changes as a width of a depletion region changes based on a magnitude of a reverse voltage provided to the phase shifter through the electrodes and a refractive index changes.

9. The optical modulator of claim 8, further comprising:
   a thermal contact region to tune a wavelength of the optical signal to be input to the optical modulator; and
   a direct current (DC) bias contact region to provide an offset to the electrical signal to be applied to the phase shifter.

10. The optical modulator of claim 8, wherein the phase shifter comprises a slab region to receive the electrical signal applied by the electrodes.

11. The optical modulator of claim 10, wherein the slab region is doped at a doping concentration higher than that for a core of the phase shifter having the PN junction.

12. The optical modulator of claim 8, wherein the operating bandwidth and an applied driving voltage of the phase shifter are adjusted based on a doping concentration of the PN diode disposed between the phase shifter and the electrodes.

13. The optical modulator of claim 12, wherein, when the doping concentration of the PN diode is less than a doping concentration of the phase shifter, the operating bandwidth increases and the applied driving voltage of the phase shifter decreases, as a total capacitance of the optical modulator decreases.

14. The optical modulator of claim 12, wherein, when the doping concentration of the PN diode is greater than a doping concentration of the phase shifter, the operating bandwidth decreases and the applied driving voltage of the phase shifter increases, as a total capacitance of the optical modulator increases.

15. The optical modulator of claim 8, configured to match a speed of the electrical signal to be propagated through the electrodes and a speed of the optical signal to be propagated through the phase shifter and to thereby increase a modulation efficiency of the optical modulator.

* * * * *